United States Patent [19]

Schroeder

[11] Patent Number: 4,713,099

[45] Date of Patent: Dec. 15, 1987

[54] MOLDED FIBERGLASS AIR RETURN FILTER GRILLE

[76] Inventor: Clifford A. Schroeder, 904 Skelton Canyon Circle, Westlake, Calif. 94015

[21] Appl. No.: 871,092

[22] Filed: Jun. 5, 1986

[51] Int. Cl.⁴ .............................................. B01D 46/10
[52] U.S. Cl. .................................... 55/385 R; 55/493; 55/494; 55/480; 55/504; 55/DIG. 31
[58] Field of Search ................... 55/385 AR, 493–495, 55/480, 502, 504, 508, 510, 527, DIG. 31

[56] References Cited

U.S. PATENT DOCUMENTS

| 3,003,581 | 10/1961 | Mreason | 55/527 X |
|---|---|---|---|
| 3,360,910 | 1/1968 | Soltis | 55/508 X |
| 3,570,220 | 3/1971 | Felter | 55/527 X |
| 3,782,082 | 1/1974 | Smith et al. | 55/504 X |
| 3,823,926 | 7/1974 | Bracich | 55/504 X |
| 4,088,463 | 5/1978 | Smith | 55/385 A X |
| 4,266,470 | 5/1981 | Schroeder et al. | 98/40.11 |
| 4,371,386 | 2/1983 | De Vecchi | 55/502 X |

Primary Examiner—Charles Hart
Attorney, Agent, or Firm—David O'Reilly

[57] ABSTRACT

An air return filter grille assembly having a perforated faceplate hingedly attached to a molded fiberglass plenum. The molded fiberglass plenum has a performed recess for reclining and positioning a filter resting on the faceplate. An abutment and leaf spring on the faceplate hold the filter firmly in the recess. The air filter grille assembly is constructed to mount easily on T-bar suspended ceilings with the perforated faceplate held closed by manually rotatable pawls. Another reason for the spring is to keep the filter in position as the unit cycles on and off, thus preventing the accumulated dust and dirt on the filter from staking down or dusting back into the room.

13 Claims, 9 Drawing Figures

MOLDED FIBERGLASS AIR RETURN FILTER GRILLE

FIELD OF THE INVENTION

This invention relates to air return filter grilles and more partiularly relates to a molded fiberglass air return filter grille having a molded fiberglass plenum with foil reinforcement and a grille hinged directly to the plenum.

BACKGROUND OF THE INVENTION

Air return filter grilles are comprised of a plenum which may be sheet metal or fiberglass, attached to a metal frame mounted in ceilings, walls, and sometimes mounted on T-bar ceilings. The frames are constructed usually of aluminum or sheet metal with a perforated face plate or grate hingedly attached on one side, closed and held in place by screws on the side opposite the hinge. The sheet metal frame has a cavity or recess for mounting a filter behind the face plate. Besides being quite heavy in construction, the replacement of the filters require special tools for releasing the screws holding the face plate in position. Another disadvantage is that the substantial metal construction can make them noisy when air is flowing through the return filter. Also the cost, weight and bulk of metal construction are additional substantial disadvantages.

It is therefore one object of the present invention to provide an air return filter mounting grille substantially lightweight in construction.

Yet another object of the present invention is to provide a air return filter grille, having a unique molded fiberglass plenum with foil reinforcement.

Yet another object of the present invention is to provide a lightweight air return filter grille, having high acoustical absorption, surpassing the substantial steel or metal units presently in use.

Still another object of the present invention is to provide air return filter grille which makes it easy to change the filter without the need for special tools or equipment.

Yet another object of the present invention is to provide an air return filter grille having an unique fiberglass construction with the perforated face plate attached by a hinge directly to the molded fiberglass to provide a substantial reduction in weight and allow easy mounting on T-bar ceilings.

Still another object is to construct an air return filter grille which mounts flush in T-bar suspended ceilings and matches in appearance air supply units. The unique construction provides a clean uncluttered design without the usual metal frame around the perforated metal face.

BRIEF DESCRIPTION OF THE INVENTION

The purpose of the present invention is to provide an improved air return filter grille that is lightweight in construction designed for easy replacement of filters without the need for tools or special equipment.

The air return filter grille of the present invention is comprised of a unique molded fiberglass plenum having a foil reinforced upper surface for connecting the plenum to a flexible air duct. A recess is molded into the plenum for receiving up to a one inch filter. The plenum dimensions are such that it will fit comfortably on the flange of bars forming suspended T-bar ceilings. The plenum is secured against movement on the T-bar by at least one flexible sheet metal tab on either side constructed to bend around the rib of a T-bar and be fastened by a sheet metal screw.

The entrance or opening to the plenum is closed by a perforated sheet metal face plate hingedly attached to the molded fiberglass plenum. The hinges are supported by a sheet metal channel clamped securely along one skirted edge of the fiberglass plenum. One side of the hinge is securely riveted or welded to the sheet metal channel while the other is riveted or welded to a flanged border on the perforated sheet metal face plate. The sheet metal channel is secured along the skirted edge of the fiberglass plenum with rivets or teeth formed by punching the sides of the sheet metal channel. The perforated face plate hinges and sheet metal channel form the only metal parts of the air return filter grille.

Mounted on the perforated face plate are a filter stop for positioning a filter in the perforated face plate and a spring for securely holding the filter against the recess in the plenum when the perforated face plate is closed. An additional, but unique feature of this system, is the inclusion of pawls which hold the perforated face plate closed by engaging the T-bar flange. Two such pawls are sufficient to hold the perforated face plate closed with the filter properly positioned in the recess in the plenum. The pawls are formed with large slots allowing them to be easily rotated by hand, a coin or similar object. Thus no special tools are necessary for opening the face plate to remove and replace the filter.

The above and other features of the invention will be more fully understood from the following detailed description and the accompanying drawings, in which:

DETAILED DESCRIPTION OF THE INVENTION

Figure 1:
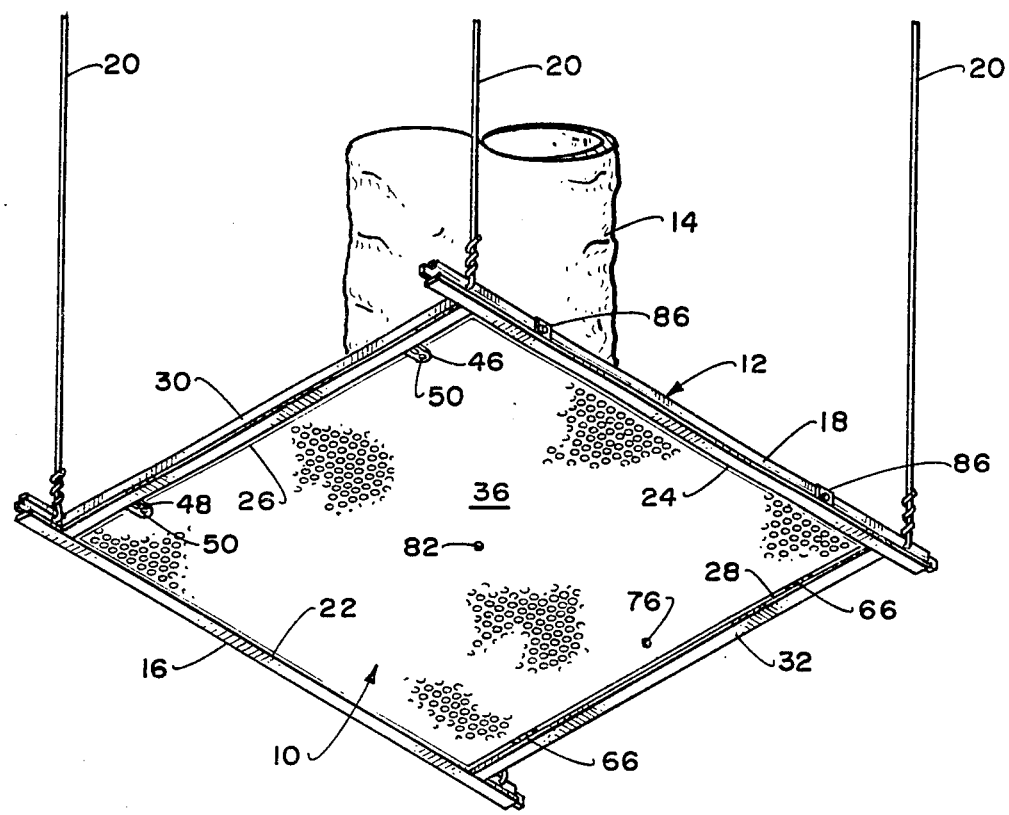
FIG. 1 is a perspective view of the air return filter grille constructed according to the invention.

Referring to FIG. 1 an air return filter grille assembly 10 constructed according to the invention is shown mounted on a suspended T-bar ceiling 12, connected to a flexible duct 14. The T-bar ceiling 12 is a suspended ceiling comprised of joists 16 and 18, suspended on wires or cables 20 secured to a solid surface or roof (not shown). The air return filter grille 10 is supported on flanges 22 and 24 on the joist 16 and 18 and on flanges 26 and 28 forming a part of crossbars 30 and 32 respectively. The air return filter grille 10 is secured to the suspended T-bar ceiling as will be described in greater detail hereinafter.

Figure 2:
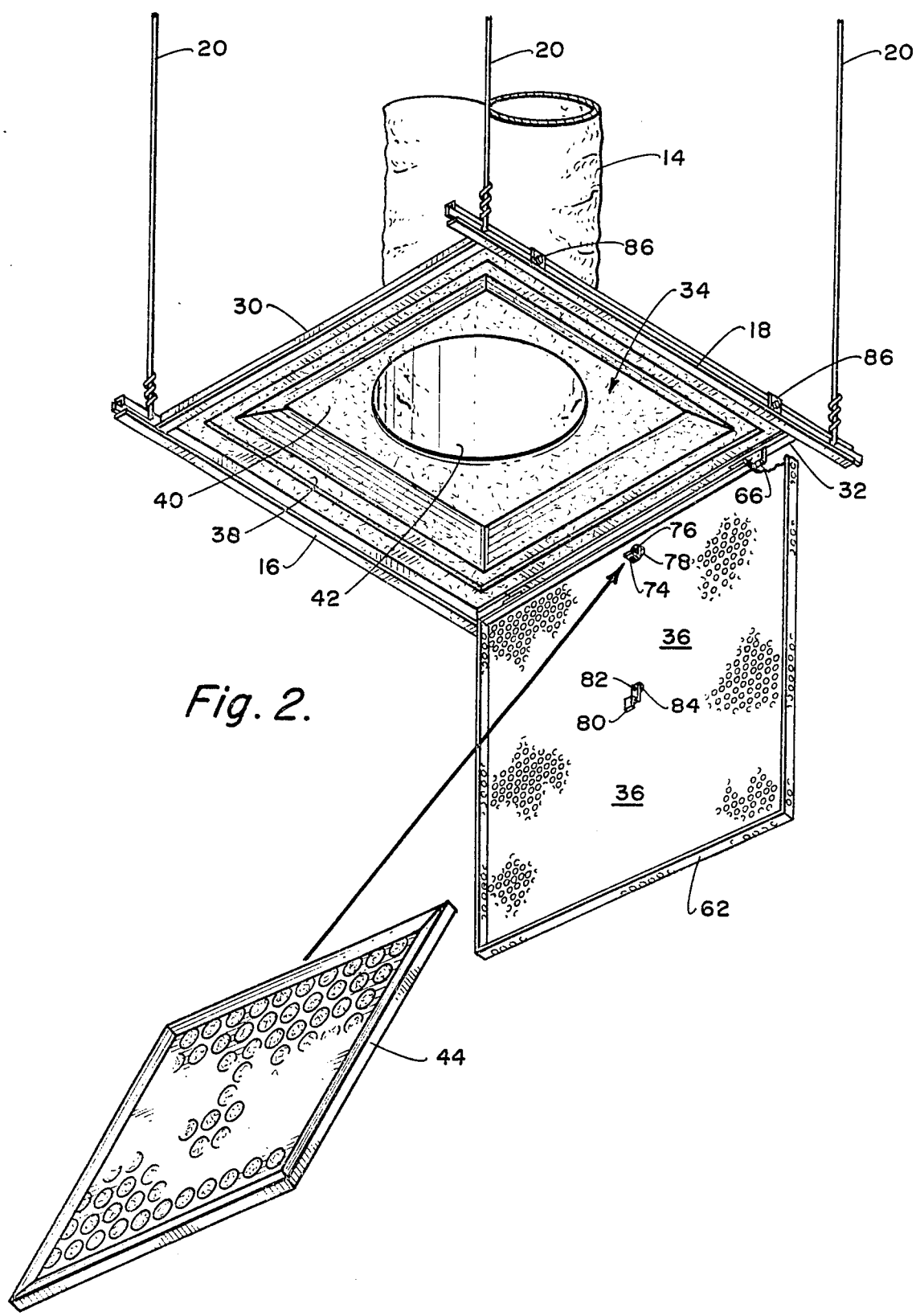
FIG. 2 is a perspective view of the air return filter grille with the perforated face plate open for installing a filter.

Air return filter grille assembly 10 has a unique very simple construction with a minimum of lightweight metal parts. In FIG. 2, air return filter grille 10 is shown comprised of a unique molded fiberglass plenum 34, having a perforated face plate 36, hingely attached directly to a skirted edge of the plenum. Molded fiberglass plenum 34 is uniquely molded to comfortably fit on a suspended T-bar construction and has a recess 38, constructed to receive half to one inch filters 44, supported by perforated face plate 36. Filter 44 lies on face plate 36, which when closed securely holds the flter in recess 38. Molded fiberglass plenum then tapers toward an upper surface 40 where the plenum is connected to duct 14 through hole 42.

It should be noted that the exterior of surface 40 is reinforced with foil 45 (FIG. 9) prescored for receiving flexible duct connections of from six to fourteen inches. This construction is similar to that shown and described in U.S. Pat. No. 4,266,470 issued May 12, 1981. As in this patent the reinforcing foil 45 protects the edges of hole 42 from fraying and provides a secure surface for connecting duct 14 to the plenum with duct tape (not shown)if desired.

Figure 3:
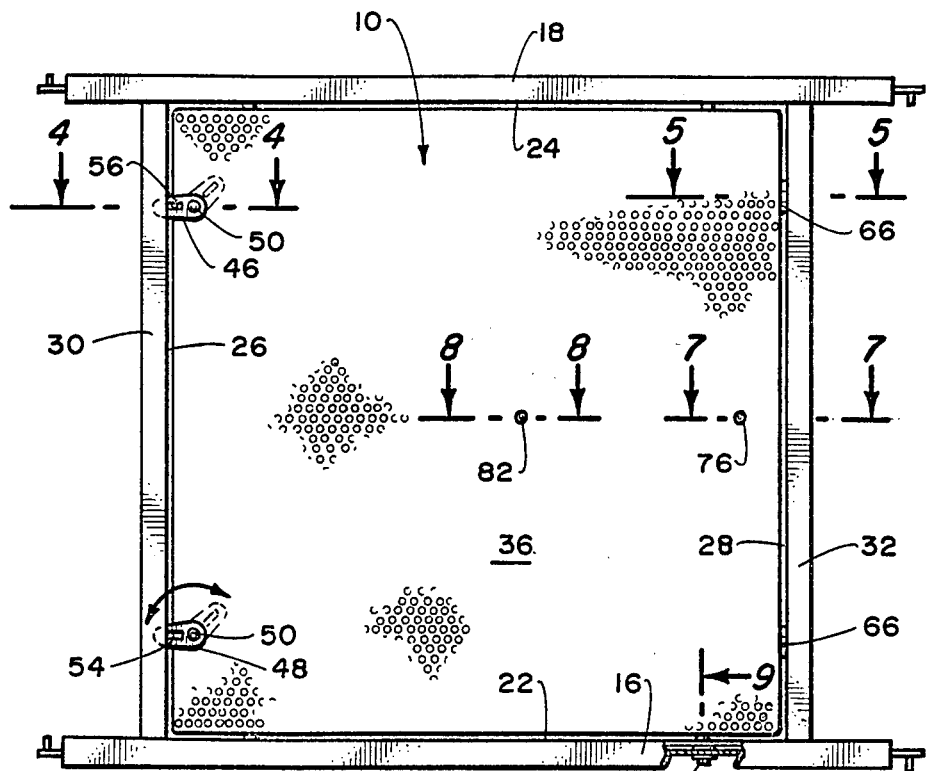
FIG. 3 is a bottom view of the air filter grille assembly mounted on a T-bar construction.

A bottom view of the air return filter grille is shown in FIG. 3 with face plate 36 closed and held in place by pawls 46 and 48, rotably mounted on face plate 36. The pawls 46 and 48 are secured to face plate 36 by rivets 50 and resilient spacers 52, allowing the pawls 46, 48 to easily rotate. Slots 54 and 56 formed in the pawls 46, 48 are made large enough so they can be easily rotated manually or with a coin, or similar object eliminating the need for any special tools to open the face plate and replace filter 44.

Figure 4:
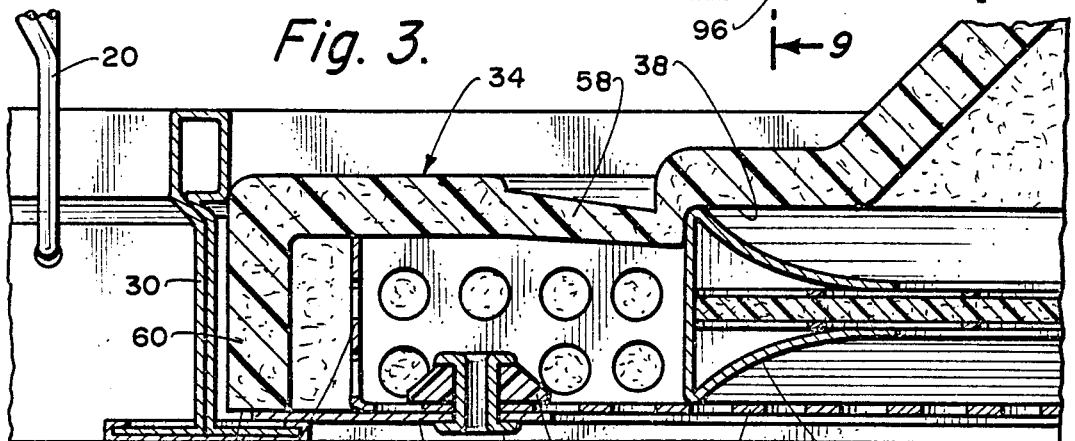
FIG. 4 is a sectional view taken at 4—4. of FIG. 3.
Figure 5:
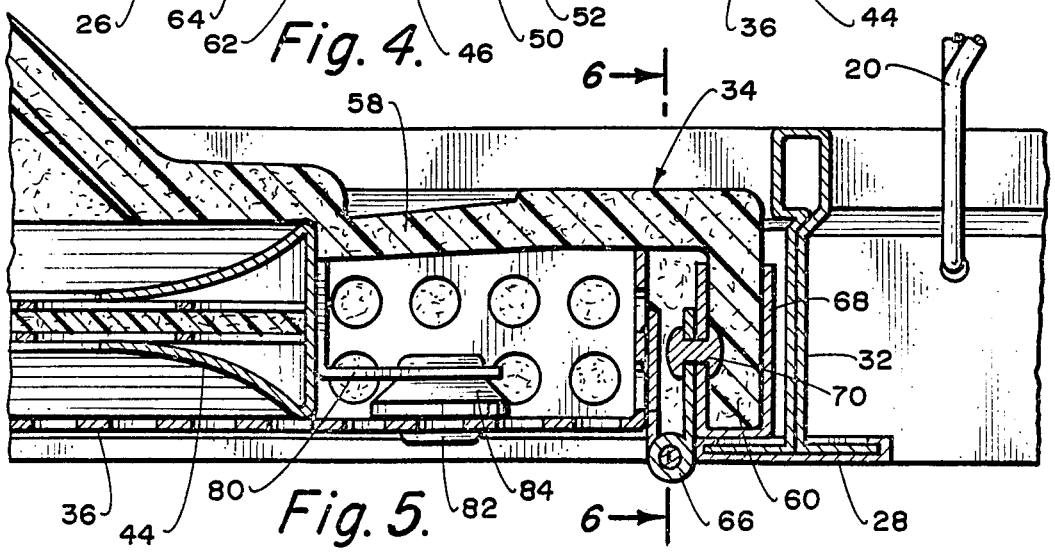
FIG. 5 is a sectional view taken at 5—5. of FIG. 3.

As can be seen in FIG. 4, filter 44 snugly fits into recess 38 formed in the molded fiberglass plenum. Recess 38 is formed in the plenum during the molding and is strengthened by slightly increasing the compression of the molded fiberglass at area 58 around the periphery of the recess. Skirt 60 on fiberglass plenum 34 provides a cavity for receiving flanged border 62 of face plate 36 so that face plate 36 is flush with lower edge 64 of the molded fiberglass plenum when closed.

Figure 6:
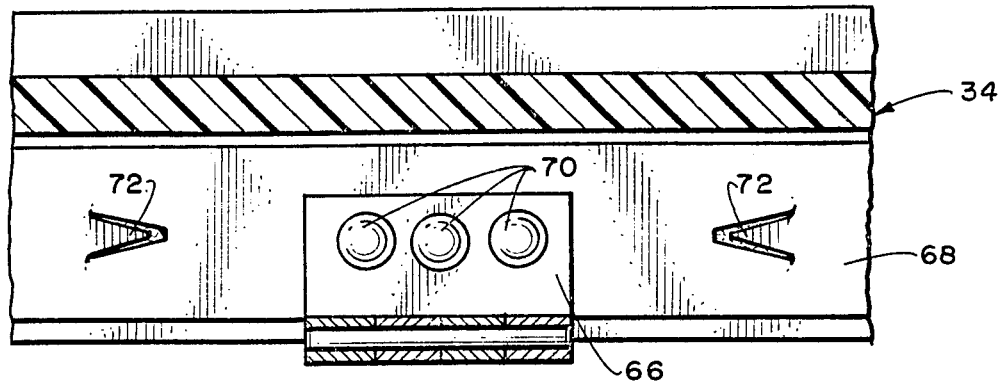
FIG. 6 is a sectional view taken at 6—6 of FIG. 5.
Figure 7:
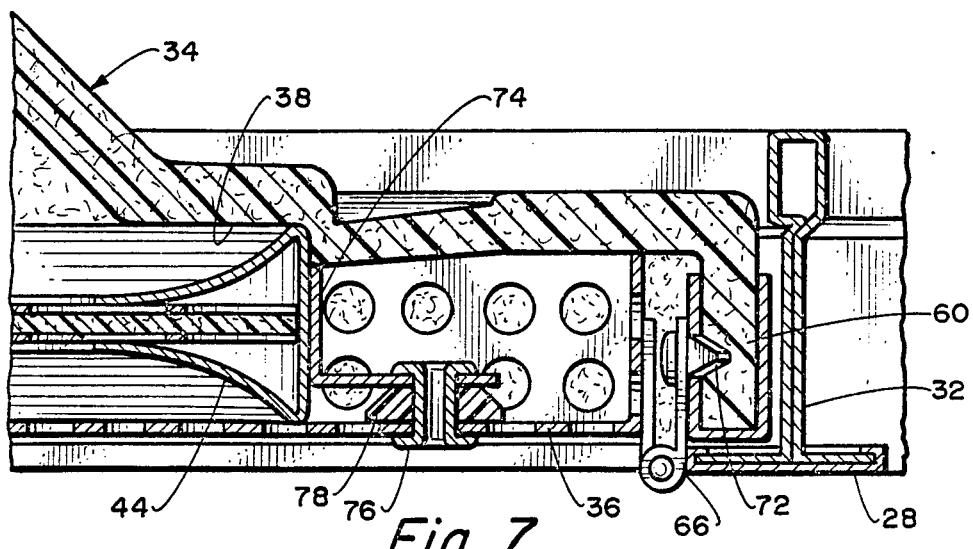
FIG. 7 is a sectional view taken at 7—7 of FIG. 3.
Figure 8:
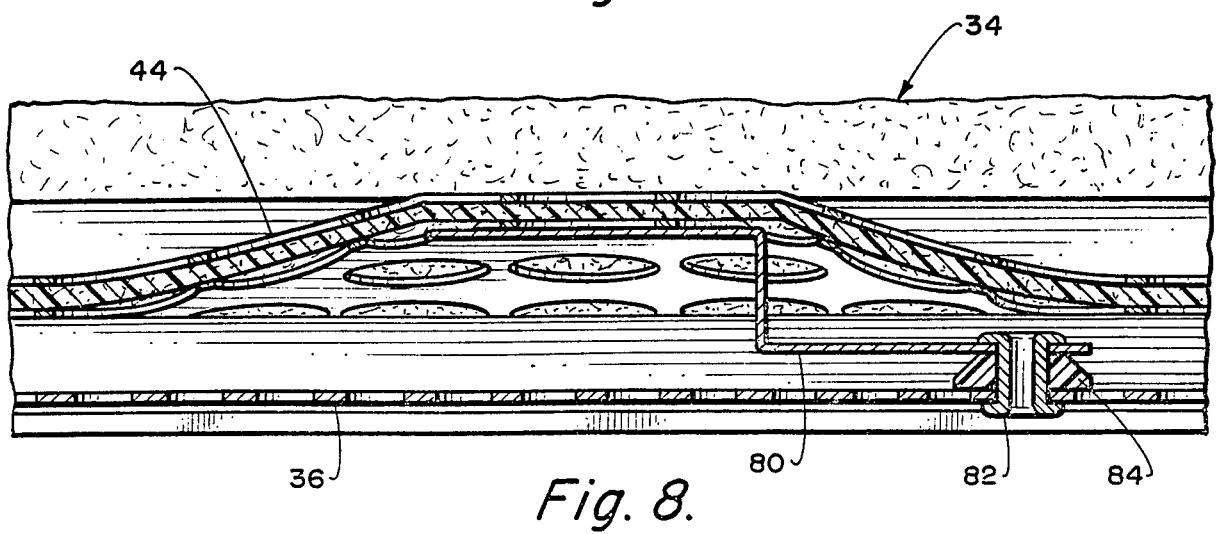
FIG. 8 is a sectional view taken at 8—8 of FIG. 3.

Perforated face plate 36 is attached to molded fiberglass plenum 34 by hinges 66 and sheet metal channel 68. Channel 68 having hinges 66 attached by rivets or welded 70 is mounted on skirt 60 of fiberglass plenum 34 by clamping the channel against the molded compressed fiberglass of the skirt. Additional gripping of the sheet metal channel 68 is provided by punching teeth 72 in the sheet metal which bite into the fiberglass of skirt 60 (FIG. 6). Perforated face plate 36 is secured to hinge 66 by spot welding.

Filter 44 is positioned on perforated face plate 36 by stop 74 secured to the face plate by rivet 76 and resilient spacer 78. To install the filter it is placed on face plate 36 in abutment with stop 74 as shown in FIG. 2.

Filter 44 is held firmly in place in recess 38 by a resilient leaf spring 80, also secured to perforated face plate 36 by a rivet 82 and resilient spacer 84. Spring 80 is configured to press against the surface of filter 44 maintaining the edges of filter in firm engagement with recess 38. This prevents any air from entering the duct that does not pass through filter 44. The leaf spring also keeps the filter in position as the unit cycles on and off thus preventing accumulating dust from shaking loose.

Figure 9:
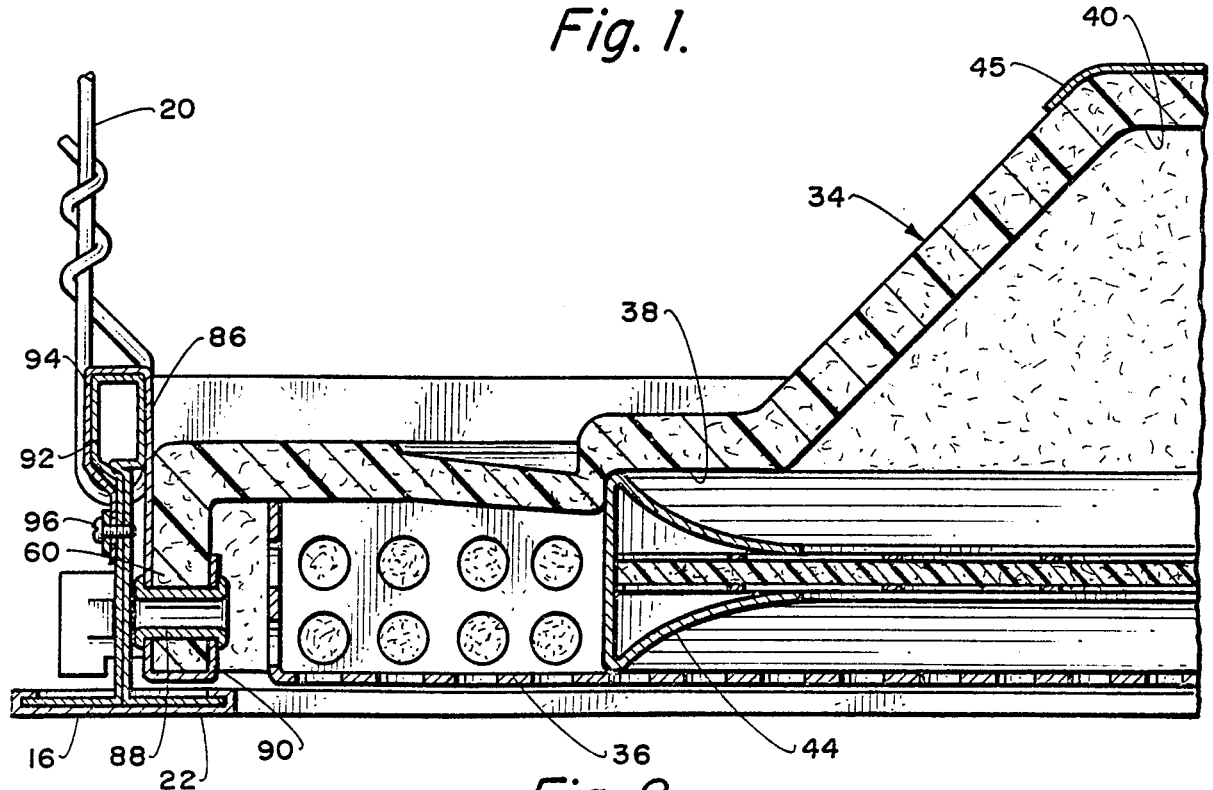
FIG. 9 is a sectional view taken at 9—9 of FIG. 3.

The mounting of the air return filter assembly in the suspended T-bar ceiling is illustrated in FIG. 9. Molded fiberglass plenum skirt 60 rests on flange 22 of joist 16. Likewise the other skirt portions of molded fiberglass plenum 34 rest on the respective flanges of the other joist and T-bar cross members. The molded fiberglass plenum is then secured against movement by thin sheet metal tabs 86 bent around skirt 60 as shown at 90 and secured by rivets 88. The Sheet metal tab 86 is also bent around joist rib 92 as shown at 94 and secured by a sheet metal screw 96. This minimizes movement and vibrations of the air return filter grille assembly.

Thus there has been described a novel and unique air return filter grille assembly comprised of a unique molded fiberglass plenum having a perforated face plate attached directly to the plenum. The perforated face plate is connected directly to the molded fiberglass plenum by a sheet metal channel mounted on the plenum skirt, having hinges connected to the perforated face plate. The molded fiberglass plenum has a recess for receiving a filter and unique pawls holding the face plate in position against the plenum when mounted on a suspended T-bar ceiling.

This invention is not to be limited by the embodiment shown in the drawings or described in the description, which is given by way of example and not of limitation but only in accordance with the scope of the appended claims.

What is claimed is:

1. An air return filter grille assembly comprising;
   a molded fiberglass plenum having an open side surrounded by a skirt;
   a filter receiving recess formed in said molded fiberglas plenum for receiving a filter;
   filter means positioned in said recess;
   a perforated faceplate fitting the open side of said plenum;
   hinge means hingedly mounting said perforated faceplate on said fiberglass plenum so that said perforated faceplate can be easily swung open to remove and replace said filter means;
   said perforated faceplate constructed and arranged to hold said filter in said recess when closed; and
   latch means on said perforated faceplate for holding said faceplate in a closed position against said open side of said molded fiberglass plenum;
   whereby filters may be easily removed and replaced by unlatching said perforated faceplate, placing a filter on said perforated faceplate and closing and latching said faceplate.

2. The grille assembly according to claim 1 in which said hinge means comprises;
   channel means mounted on said skirt along one side of said molded fiberglass plenum;
   at least one hinge secured to said channel and said perforated faceplate.

3. The grille assembly according to claim 2 in which said channel is a sheet metal channel securely clamped to said skirted edge of said fiberglass plenum.

4. The grille assembly according to claim 3 in which said sheet metal channel includes teeth which bite into the molded fiberglass to hold said channel on said molded fiberglass plenum.

5. The grille assembly according to claim 4 in which said teeth are formed by punching said sheet metal channel.

6. The grille assembly according to claim 1 in which said larch means for holding said perforated faceplate closed comprises pawl means rotatably mounted on said peforated faceplate.

7. The grille assembly according to claim 6 in which said molded fiberglass plenum is constructed to be mounted on suspended T-bar ceilings;
   said pawl means constructed and arranged to engage a flange on a T-bar of said T-bar ceiling thereby holding said perforated faceplate in a closed position.

8. The grille assembly according to claim 7 in which said pawl means comprises a pair of spaced apart pawls.

9. The grille assembly according to claim 1 including filter positioning means on said perforated faceplate.

10. The grille assembly according to claim 9 in which said filter positioning means comprises an abutment stop adapted to abut one side of said filter when placed on said perforated faceplate.

11. The grille assembly according to claim 10 including leaf spring means mounted on said perforated faceplate for holding a filter firmly in said filter reclining recess.

12. The grille assembly according to claim 7 including means for securing said molded fiberglass plenum against movement when mounted on said suspended T-bar ceiling.

13. The grille assembly according to claim 7 in which said securing means comprises at least one bendable sheet metal strip attached to said skirt on opposite sides of said molded fiberglass plenum;

said bendable sheet metal strips adapted to be bent over a rib of said T-bars and secured with a sheet metal screw.

* * * * *